Aug. 7, 1951        G. S. PFEIFFER        2,563,742
CONTROL CIRCUIT
Filed May 28, 1945
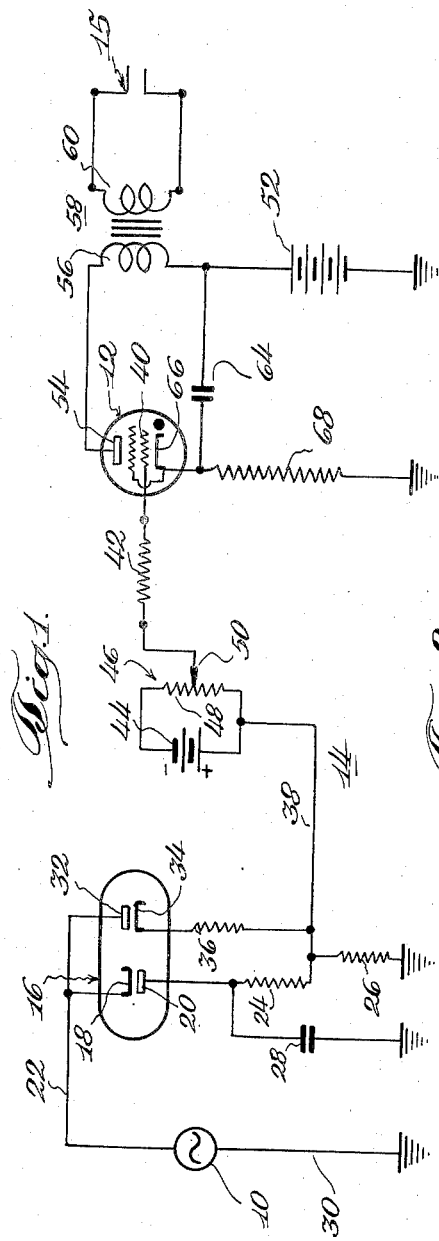
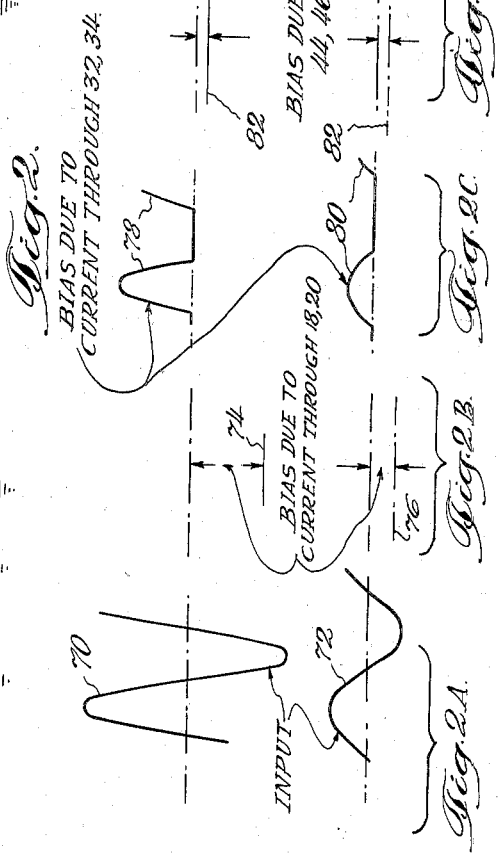
Inventor:
George S. Pfeiffer
By Williams, Bradbury & Hinkle
Attorneys Patented Aug. 7, 1951

2,563,742

UNITED STATES PATENT OFFICE 2,563,742

CONTROL CIRCUIT

George S. Pfeiffer, Oak Park, Ill., assignor to Stewart-Warner Corporation, Chicago, Ill., a corporation of Virginia Application May 28, 1945, Serial No. 596,345

5 Claims. (Cl. 250—27)

The present invention relates to control circuits and more particularly to electronic control circuits for triggering or firing trigger devices and for producing voltage impulses.

The invention has for its primary object the provision of a new and improved control circuit for triggering or firing a trigger device and for producing voltage impulses at predetermined phase positions of an alternating current control or input voltage, irrespective of the amplitude and frequency of the voltage.

Another object of the present invention is the provision of a new and improved electronic control circuit for triggering or firing a trigger device at the instant a sinusoidal alternating current input voltage is at a predetermined phase position in its cycle, and more specifically, at the instant the voltage reaches a maximum positive value or some selected phase position during the portion of the cycle during which it rises from zero to a maximum positive value, and further, for producing voltage impulses at the same time.

A further object of the present invention is the provision of a new and improved adjustable electronic control circuit for triggering or firing a trigger device at the maximum positive value of an alternating current input voltage or at some selected phase position between zero and the maximum positive value and for producing voltage impulses at the same time.

A still further object of the present invention is the provision of a new and improved control circuit for firing or triggering a trigger device at predetermined and, preferably adjustable, phase positions of an alternating current input voltage which means includes means for producing a substantially uniform direct current control voltage proportional to the peak value of the input voltage and a second direct current variable control voltage having a peak value proportional to the peak value of the alternating current voltage and means for combining the two voltages conjointly to control the trigger device, and further, including means controlled by the trigger device for producing voltage impulses.

Other objects and advantages of the present invention will become apparent from the ensuing description of an illustrative embodiment in the course of which reference is had to the accompanying drawing, in which:

Fig. 1 is a schematic diagram of one embodiment of the invention;

Fig. 2 is a composite drawing illustrating particularly the manner in which the two control voltages are obtained and combined conjointly to control the trigger device.

The control circuit of the present invention is susceptible to various uses. It may be used in the control of trigger devices generally and more specifically it may be used to control cathode ray tube circuits used in the analysis of wave forms or to control stroboscopic devices used with wheel balancing apparatus of the electronic type. It is especially adapted for use with or as a part of electronic wheel balancing apparatus of the type including a gaseous discharge tube used as a stroboscopic light source—the tube being periodically rendered conductive, or fired, under the control of an input or main control voltage having a substantially sinusoidal wave form. In apparatus of this type it is necessary that the gas tube, or strobotron, be fired at a relatively invariable phase position or angle of the input voltage—otherwise the tube would be fired at different cyclic positions and erroneous readings or observations result. Difficulties have been encountered with existing types of apparatus because the input voltage varies in amplitude and frequency in different vehicles, or even parts of the same vehicle, such as the wheels of automobiles or aircraft. The difficulties arising from varying amplitude and frequency are avoided with the apparatus of the present invention.

An alternating current main control or input voltage, as it will be referred to hereinafter, is supplied by a suitable source 10, which may be, as already indicated, a pickup device of an electronic wheel balancing system and consisting of a magnetic pickup. The amplitude of the sine wave generated by the pickup varies with the velocity of the motion of the pickup armature and also with the frequency. As the frequency is reduced, the amplitude decreases. As the velocity is decreased, the amplitude is decreased.

When the resonant frequency of the mechanical elements of the wheel is reached, the peak of the sine wave is in phase with the force causing the unbalance. It is desirable to fire a trigger device, which may be a thyratron tube 12, at the peak of the sine wave, thereby more readily to locate the locus of the unbalance. The circuit of the present invention, indicated as a whole by reference character 14, and interconnecting the source 10 and trigger device 12 enables the trigger device to be fired at the peak of the alternating current input voltage, or at some desired point between zero and the peak of the voltage in a positive direction. Furthermore, voltage impulses are produced in an output circuit 15 under the control of the thyratron, and, these impulses may be used for various purposes such as firing a strobotron tube.

The operation of the circuit 14 of the present invention is based on the principle of subtracting from a variable voltage wave an automatically adjusted substantially steady or uniform voltage having a magnitude such that the algebraic sum of the steady voltage and variable voltage is independent of the amplitude of the variable voltage, whereby the resulting control voltage may be used to fire the trigger device or tube at the instant the variable voltage reaches its maximum value.

Referring now more particularly to Fig. 1 the substantially uniform control voltage, which is preferably a negative direct current voltage, is supplied by means including one portion of a rectifier tube 16 (a portion including cathode 18 and anode 20, the former of which is connected to one terminal of source 10 through conductor 22), a pair of series connected resistors 24 and 26 and a capacitor 28 connected in parallel to the series connected resistors. One terminal of resistor 26 and of capacitor 28 is grounded, as is the other terminal of source 10, the latter being grounded through conductor 30.

The alternating current supplied from source 10 to the rectifier and circuit just described produces a substantially steady or uniform voltage across the series connected resistors, or each of them, resulting from the fact that the circuit 24—26—28 has a time constant relatively large as compared with the frequency of the input voltage. In one embodiment of the invention the tube 16 was a 6-H-6 tube, the resistors 24 and 26 had values of 200,000 and 100,000 ohms, respectively, and the capacitor 28 had a capacity of 1 mfd.

The means for producing the variable voltage includes a second rectifier section of tube 16 (consisting of an anode 32 connected to conductor 22 and a cathode 34) and a resistor 36 connected between cathode 34 and resistor 26. It is to be noted that the rectifier section 32—34 rectifies on alternate half-cycles as compared with the other rectifier section and that a positive control voltage varying with the input voltage appears across resistors 26 and 36, or each of them. It is to be noted further that the voltage across the resistors is variable because of the interposition of the resistor 24 between resistors 36 and 26 and the capacitor 28.

In the event the phase of the alternating current input voltage coincides with the phase of the motion of the vehicle wheel being balanced and it is desired to fire the tube 12 at the peak of the positive half cycle of the input voltage, then the resistor 36 should have a value substantially equal to that of resistor 24, or a value of 200,000 ohms in this case. Other values may be used, as will be pointed out hereinafter, in the event it is desired to fire tube 12 at some earlier phase position.

Voltages proportional to the outputs of the rectifiers are combined algebraically and supplied to the trigger device 12, whereby the trigger device is controlled conjointly by the two voltages. The combining of the voltages results from the inter-connection of the two rectifiers through the common resistor 26, the ungrounded terminal of which is connected by conductor 38 to the control grid 40 of the trigger device—a thyratron tube, as of the 2051 type. A resistor 42 is interposed in this circuit in order to limit a grid current which may flow under certain circumstances.

A constant grid bias is supplied to the control grid by a battery 44 and a potentiometer 46 including a resistor 48 and an adjustable connection 50, whereby the firing level of the trigger device may be adjusted. The trigger device is supplied, preferably, with a constant anode voltage from a battery 52, the positive terminal of which is connected to the anode 54 of the trigger device through the primary winding 56 of a transformer 58. The secondary winding 60 of the transformer is connected to the output line 15 in which a relatively sharp voltage impulse occurs each time the tube 12 is rendered conductive. This impulse may be used for desired control purposes, such as the firing of a strobotron.

When the tube 12 is rendered conductive a capacitor 64 connected across the battery and cathode 66 of the tube discharges through the tube and transformer primary winding 56 to provide an impulse in the secondary circuit. The cathode 66 of the gas tube is connected to ground through a resistor 68, through which the capacitor 64 is charged. The charging current through this resistor places a negative bias upon the control grid 40 of the tube to prevent the tube from firing more than once per input voltage cycle, in accordance with known principles.

The principles and operation of the present invention may be better understood from a consideration of Fig. 2 which graphically illustrates the operation with alternating current input voltages of different amplitudes and frequencies. In Fig. 2A, a high frequency, high amplitude input voltage is indicated by reference character 70 and a lower amplitude and lower frequency input voltage is indicated by the reference character 72.

Alternate half cycles passing through the rectifier section 18, 20 provide a substantially steady or uniform negative bias which is applied through conductor 38 and resistor 42 to the grid 40 of the trigger device. The bias resulting from the higher amplitude input voltage 70 is indicated by reference character 74, in Fig. 2B, and that resulting from the lower amplitude input voltage 72 is indicated by reference character 76.

A varying or fluctuating positive bias is provided during the other alternate half cycles by the current passing through the rectifier section 32, 34. They are indicated, in Fig. 2C, by reference characters 78 and 80 for the high and low amplitude input voltages 70 and 72, respectively. This bias is also applied to the grid of the trigger tube 12 through the conductor 38 and resistor 42.

A constant bias, indicated by reference character 82 in Fig. 2D, is applied to the grid 40 from the battery 44 and the potentiometer 46. This constant bias is adjusted to be just sufficient to prevent the tube 12 from firing in the absence of any input voltage to the apparatus.

The various bias voltages are, as a matter of fact, algebraically combined when applied to the grid thereby providing a composite bias voltage controlling the tube. The composite bias voltage for the high amplitude input voltage 70 is indicated by reference character 84, in Fig. 2E, and the one for the low amplitude input voltage is indicated by reference character 86. It will be noted that the peak values 84A and 86A occur at the firing level of the trigger device, the firing level being indicated by reference character 88 in Fig. 2F, which level is slightly less negative than the constant bias 82.

In order to adjust the control circuit for firing the tube 13 at the peak positive value of the input voltage wave, the peak values 78 or 80 of the fluctuating voltage are made equal to the relatively uniform biases 74 or 76. This is accomplished, as heretofore indicated, by making resistors 24 and 36 substantially equal.

In order to trigger the tube 12 at some earlier phase position, it is necessary to reduce the substantially uniform negative bias so that the firing level is reached at an earlier phase position of the positive fluctuating bias. This can readily be accomplished by making the value of resistor 24 greater that that of resistor 36. This has the effect of reducting the proportion of the negative bias applied to the grid of the trigger device.

Voltage impulses are produced in the output line 15 each time the tube 12 is rendered conductive. As heretofore indicated, the impulses are produced by the discharge of the capacitor 64 through the tube and through the primary winding 56 of the transformer 58. The current flowing through the primary winding induces voltage impulses of desired voltage in the secondary winding 60, to which the output line 15 is connected.

While the present invention has been described in connection with the details of a particular embodiment thereof, it should be understood that such details are not intended to be limitative of the invention except in so far as set forth in the accompanying claims.

Having thus described my invention, what I claim as new and desire to secure by Letters Patent of the United States is:

1. A control circuit for connecting a source of alternating current signals having variable amplitude and frequency with a trigger device operable by triggering pulses of a given polarity for triggering the trigger device in synchronism with the peaks of one polarity of the alternating current signals from the source, comprising the combination of a first rectifier coupled to the source connected to conduct currents of the given polarity, a first output circuit connected with the first rectifier to transmit signals of the given polarity consisting of half waves of the alternating current signals from the source, a second rectifier coupled to the source connected to conduct currents having a polarity opposite the given polarity, a second output circuit connected with the second rectifier to transmit direct current signals having a polarity opposite the given polarity and substantially proportional to the magnitude of the alternating current proportional to the magnitude of the alternating current signals from the source and approximately equal to the peak value of the half wave signals transmitted by the first output circuit, a mixing circuit connected to the first and second output circuits for combining the output signals therefrom, and means connecting the mixing circuit with the trigger device.

2. A control circuit for connecting a source of alternating current signals having variable amplitude and frequency with a normally nonconductive gaseous electrical discharge trigger device capable of being rendered conductive by triggering voltages exceeding a predetermined value for triggering the trigger device in synchronism with the positive peaks of the alternating current signals from the source, comprising the combination of a first rectifier coupled to the source connected to conduct positive currents, a first output circuit connected with the first rectifier to transmit positive signals consisting of positive half waves of the alternating current signals from the source, a second rectifier coupled to the source connected to conduct negative currents, a second output circuit coupled with the second rectifier to transmit negatively polarized direct current signals substantially proportional in magnitude to the amplitude of the alternating currrent signals from the source and approximately equal to the peak value of the half wave signals transmitted by the first output circuit, a mixing circuit to the first and second output circuits for combining the output signals therefrom, and means connecting the mixing circuit with the trigger device.

3. A control circuit for connecting a source of alternating current signals having variable amplitude and frequency with a trigger device operable by triggering pulses of a given polarity exceeding a predetermined magnitude and for triggering the trigger device when the alternating current signals reach maximum values in one direction, comprising the combination of a first rectifier coupled to the source connected to conduct currents of the given polarity, a first output circuit which is substantially resistive at frequencies within the range of variation of the alternating current signals and which is connected with the first rectifier to transmit signals of the given polarity consisting of half waves of the alternating current signals from the source, a second rectifier coupled to the source connected to conduct currents having a polarity opposite the given polarity, a second output circuit connected with the second rectifier, a low pass filter forming a part of the second output circuit providing great attenuation to frequencies within the range of variation of the alternating current signals so that the second output circuit transmits direct current signals having a polarity opposite the given polarity and having a magnitude substantially proportional to the amplitude of the alternating current signals from the source and approximately equal to the peak value of the half wave signals transmitted by the first output circuit, a mixing circuit connected to the first and second output circuits for algebraically combining the output signals therefrom, and means connecting the mixing circuit with the trigger device.

4. A control circuit for connecting a source of alternating current signals having variable amplitude and frequency with a normally nonconductive gaseous electron discharge trigger device operable by positive triggering pulses exceeding a predetermined value and for triggering the trigger device whenever the alternating current signals attain instantaneous positive maximum values, comprising the combination of an input conductor for receiving signals from the source, an output conductor for delivering pulses to the trigger device, a common conductor, a first rectifier connected to the input conductor to conduct positive currents, a second rectifier connected to the input conductor to conduct negative currents, a substantially resistive load impedance connected between the output conductor and the common conductor, a substantially resistive circuit connecting the first rectifier with the output impedance to transmit positive half waves of the alternating current signals from the source, and a second circuit including a capacitor connected to the common conductor greatly attenuating signals having frequencies in the range of variation of the alternating current signals and transmitting negatively polarized direct current signals having a magnitude substantially proportional to the amplitude of the alternating current signals and approximately equal to the peak value of the half wave signals transmitted by the resistive circuit connected with the first rectifier, whereby the positive half wave signals and the negative direct current signals combined by the output impedance exceed the predetermined positive value substantially only at the instant of the positive peaks of the half waves.

5. A control circuit for connecting a source of alternating current signals having variable amplitude and frequency with a normally non-conductive gaseous electron discharge trigger device operable by positive triggering pulses exceeding a predetermined value and for triggering the trigger device whenever the alternating current signals attain instantaneous positive maximum values, comprising the combination of an input conductor for receiving signals from the source, an output conductor for delivering pulses to the trigger device, a common conductor, a first rectifier connected to the input conductor to conduct positive currents, a second rectifier connected to the input conductor to conduct negative currents, a substantially resistive load impedance connected between the output conductor and the common conductor, a substantially resistive circuit connecting the first rectifier with the output impedance to transmit positive half waves of the alternating current signals from the source, means including a capacitor connecting the second rectifier with the common conductor greatly to attenuate signals having frequencies in the range of variation of the alternating current signals, and a second circuit connecting the second rectifier with the output impedance and having a resistance substantially equal to the resistance of said substantially resistive circuit to transmit negatively polarized direct current signals having a magnitude substantially proportional to the amplitude of the alternating current signals and approximately equal to the peak value of said half wave signals, whereby the positive half wave signals and the negative direct current signals combined by the output impedance exceed the predetermined positive value only for an instant at the positive peaks of the half waves.

GEORGE S. PFEIFFER.

REFERENCES CITED

The following references are of record in the file of this patent:

UNITED STATES PATENTS

| Number | Name | Date |
| --- | --- | --- |
| 2,188,611 | Norton | Jan. 30, 1940 |
| 2,428,011 | Chatterjea | Sept. 30, 1947 |
| 2,428,913 | Hulst | Oct. 14, 1947 |

Certificate of Correction

Patent No. 2,563,742 — August 7, 1951

GEORGE S. PFEIFFER

It is hereby certified that error appears in the printed specification of the above numbered patent requiring correction as follows:

Column 5, line 15, for "reducting" read *reducing*; lines 57 and 58, strike out "proportional to the magnitude of the alternating current"; column 6, line 15, before "to" insert *connected*;

and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*